United States Patent
Kamisuki (10) Patent No.: US 9,377,484 B2
(45) Date of Patent: Jun. 28, 2016

(54) PHYSICAL QUANTITY SENSOR AND ELECTRONIC APPARATUS

(71) Applicant: Seiko Epson Corporation, Tokyo (JP)

(72) Inventor: Shinichi Kamisuki, Shiojiri (JP)

(73) Assignee: Seiko Epson Corporation (JP)

( * ) Notice: Subject to any disclaimer, the term of this patent is extended or adjusted under 35 U.S.C. 154(b) by 521 days.

(21) Appl. No.: 13/859,362

(22) Filed: Apr. 9, 2013

(65) Prior Publication Data

US 2013/0269434 A1    Oct. 17, 2013

(30) Foreign Application Priority Data

Apr. 11, 2012   (JP) ................. 2012-089968

(51) Int. Cl.
*G01P 15/125* (2006.01)
*G01P 15/08* (2006.01)

(52) U.S. Cl.
CPC ....... *G01P 15/125* (2013.01); *G01P 2015/0831* (2013.01)

(58) Field of Classification Search
CPC ................ G01P 15/125; G01P 2015/0831
USPC ........................................ 73/514.32
See application file for complete search history.

(56) References Cited

U.S. PATENT DOCUMENTS

| 5,095,752 | A | * | 3/1992 | Suzuki | G01P 15/131 |
| | | | | | 73/514.32 |
| 5,404,749 | A | | 4/1995 | Spangler | |
| 5,488,864 | A | | 2/1996 | Stephan | |
| 5,905,203 | A | | 5/1999 | Flach et al. | |
| 6,263,735 | B1 | | 7/2001 | Nakatani et al. | |
| 6,513,380 | B2 | | 2/2003 | Reeds, III et al. | |
| 7,121,141 | B2 | | 10/2006 | McNeil | |
| 7,225,675 | B2 | * | 6/2007 | Kato | G01P 15/125 |
| | | | | | 73/514.32 |
| 7,426,863 | B2 | | 9/2008 | Kuisma | |
| 8,079,262 | B2 | | 12/2011 | Guo | |

FOREIGN PATENT DOCUMENTS

| JP | 6-308152 A | 11/1994 |
| JP | H07-325106 A | 12/1995 |
| JP | H09-145514 A | 6/1997 |
| JP | 9189716 A | 7/1997 |
| JP | 2000-275272 A | 10/2000 |
| JP | 3325133 B2 | 9/2002 |
| JP | 3328707 B2 | 9/2002 |

(Continued)

*Primary Examiner* — John Chapman, Jr.
(74) *Attorney, Agent, or Firm* — Harness, Dickey & Pierce, P.L.C.

(57) ABSTRACT

A physical quantity sensor includes: a first substrate including a first fixed electrode portion disposed on a first base surface and a first through-hole penetrating the front and rear of the substrate; a second substrate including a second fixed electrode portion disposed on a second base surface and a second through-hole penetrating the front and rear of the substrate, the second base surface being arranged to face the first base surface; and a movable body arranged between the first substrate and the second substrate with gaps and including a movable electrode portion facing the first fixed electrode portion and the second fixed electrode portion. In the first through-hole, a first through-electrode electrically connected with the first fixed electrode portion is disposed. In the second through-hole, a second through-electrode electrically connected with the second fixed electrode portion is disposed.

8 Claims, 7 Drawing Sheets

(56) References Cited

FOREIGN PATENT DOCUMENTS

| JP | 3489117 B2 | 1/2004 |
|----|------------|--------|
| JP | 2008-544243 A | 12/2008 |
| JP | 2009109494 A | 5/2009 |
| JP | 2009-121881 A | 6/2009 |
| JP | 2009-537803 A | 10/2009 |
| JP | 2009250955 A | 10/2009 |
| JP | 2009-276305 A | 4/2010 |
| JP | 2010078465 A | 4/2010 |

* cited by examiner

PHYSICAL QUANTITY SENSOR AND ELECTRONIC APPARATUS

BACKGROUND

1. Technical Field

The present invention relates to a physical quantity sensor and an electronic apparatus.

2. Related Art

In recent years, physical quantity sensors that detect physical quantity, such as inertial sensors, have been developed using, for example, a silicon MEMS (Micro Electro Mechanical Systems) technique.

For example, JP-T-2008-544243 discloses an electrostatic capacitive physical quantity sensor that detects acceleration. In the physical quantity sensor, a movable sensor portion is arranged between an upper support substrate and a lower support substrate, an electrode arranged to face the sensor portion is formed on each of the upper support substrate and the lower support substrate, and a capacitive element is formed on and below the sensor portion.

However, in the physical quantity sensor disclosed in JP-T-2008-544243, a wiring terminal (external connection terminal) electrically connected with the capacitive elements formed on and below the sensor portion is disposed only on the lower support substrate side. Therefore, a difference in length occurs between a wiring path from the fixed electrode to the external terminal in the upper capacitive element and a wiring path from the fixed electrode to the external terminal in the lower capacitive element. Hence, a parasitic capacitance that is different between lead-out wirings from the fixed electrodes of the upper and lower capacitive elements is generated, leading to a problem that respective wiring capacitances are not equal to each other.

SUMMARY

An advantage of some aspects of the invention is to provide a physical quantity sensor having capacitive elements formed on and below a movable body as a sensor portion, in which a difference in length between wiring paths can be made small in wirings from fixed electrodes above and below the movable body to respective external terminals.

The invention can be implemented as the following modes or application examples.

APPLICATION EXAMPLE 1

A physical quantity sensor according to this application example includes: a first substrate including a first fixed electrode portion disposed on a first base surface and a first through-hole penetrating the front and rear of the substrate; a second substrate including a second fixed electrode portion disposed on a second base surface and a second through-hole penetrating the front and rear of the substrate, the second base surface being arranged to face the first base surface; and a movable body arranged between the first substrate and the second substrate and including a movable electrode portion facing the first fixed electrode portion and the second fixed electrode portion, wherein a first through-electrode electrically connected with the first fixed electrode portion is disposed in the first through-hole, and a second through-electrode electrically connected with the second fixed electrode portion is disposed in the second through-hole.

According to the physical quantity sensor, since the physical quantity sensor includes a structure in which the movable electrode portion is interposed between the first fixed electrode portion and the second fixed electrode portion with gaps, it is possible to provide the physical quantity sensor having capacitive elements formed on and below the movable body. Moreover, in the physical quantity sensor, the first through-electrode is disposed in the first through-hole of the first substrate, and the second through-electrode is disposed in the second through-hole of the second substrate. Hence, it is possible to provide the physical quantity sensor having capacitive elements disposed on and below the movable body, in which a difference in length between wiring paths from the respective fixed electrodes to external terminals can be made small.

APPLICATION EXAMPLE 2

In the physical quantity sensor according to the application example, an electrical characteristic of a wiring from the first fixed electrode portion to the first through-electrode may be the same as an electrical characteristic of a wiring from the second fixed electrode portion to the second through-electrode.

According to such a physical quantity sensor, it is possible to provide the physical quantity sensor in which a difference in length between the wiring paths from the respective fixed electrodes to the external terminals can be made smaller.

APPLICATION EXAMPLE 3

In the physical quantity sensor according to the application example, the first through-hole may be arranged so as to overlap with at least a portion of the first fixed electrode portion in plan view, and the second through-hole may be arranged so as to overlap with at least a portion of the second fixed electrode portion in plan view.

According to such a physical quantity sensor, the wiring paths can be designed such that the lengths of the wiring paths from the respective fixed electrodes to the external terminals are shorter. Hence, it is possible to provide the physical quantity sensor in which the influence of a parasitic capacitance in the wiring from the fixed electrode to the external terminal is more reduced.

APPLICATION EXAMPLE 4

In the physical quantity sensor according to the application example, the first substrate may have a first outer surface having a front-and-rear relationship with the first base surface, the second substrate may have a second outer surface having a front-and-rear relationship with the second base surface, a first wiring connected to the first through-electrode may be disposed on the first outer surface, a second wiring connected to the second through-electrode may be disposed on the second outer surface, and the first wiring may have the same electrical characteristic as that of the second wiring.

APPLICATION EXAMPLE 5

In the physical quantity sensor according to the application example, the first wiring may extend from over the first outer surface of the first substrate to over a side surface of the first substrate, and the second wiring may extend from over the second outer surface of the second substrate to over a side surface of the second substrate.

APPLICATION EXAMPLE 6

In the physical quantity sensor according to the application example, a first protruding portion may be disposed on the first base surface of the first substrate, a second protruding portion may be disposed on the second base surface of the second substrate, and the movable body may be held between the first protruding portion and the second protruding portion.

APPLICATION EXAMPLE 7

An electronic apparatus according to this application example includes the physical quantity sensor according to the application example.

According to the electronic apparatus, since the physical quantity sensor according to the application example is included, the electronic apparatus can have the physical quantity sensor having capacitive elements disposed on and below the movable body, in which a difference in length between wiring paths from the respective fixed electrodes to external terminals can be made small.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail using the drawings. The embodiments described below do not unduly limit the contents of the invention set forth in the appended claims. Moreover, not all of configurations described below are indispensable constituent features of the invention.

1. Physical Quantity Sensor According to First Embodiment

First, a physical quantity sensor 100 according to a first embodiment will be described with reference to the drawings. The physical quantity sensor 100 according to the embodiment can be used as, for example, an inertial sensor. Specifically, the physical quantity sensor 100 can be used as, for example, an acceleration sensor (electrostatic capacitive acceleration sensor or electrostatic capacitive MEMS acceleration sensor) for measuring acceleration in the vertical direction (Z-axis direction).

However, the structure of a movable body 20 applied to the physical quantity sensor 100 according to the embodiment is not limited to the following structure. The structure of the movable body 20 is not particularly limited as long as a capacitive element can be formed on and below the movable body 20 and the movable body 20 can be applied to an electrostatic capacitive physical quantity sensor that detects acceleration. In the following description, the physical quantity sensor 100 to which one form of the movable body 20 is applied will be described.

Figure 1:
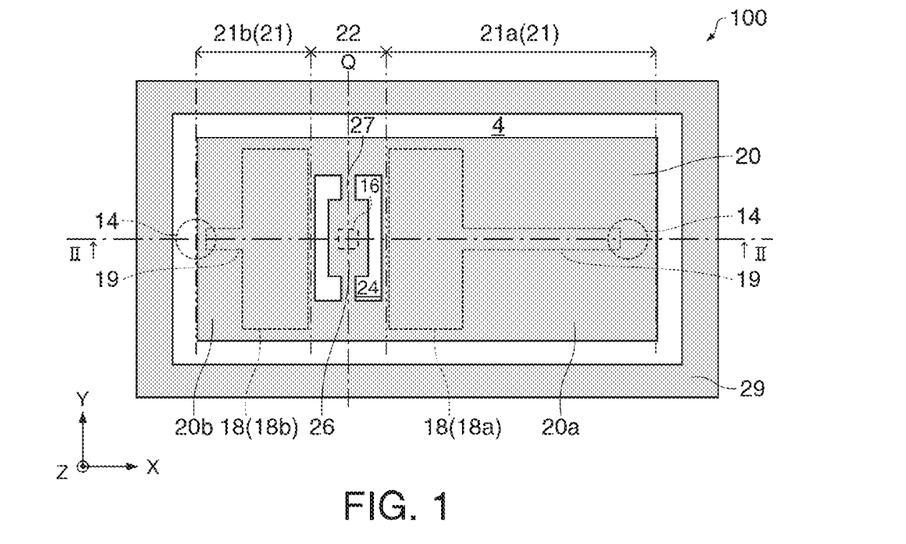
FIG. 1 is a plan view schematically showing a physical quantity sensor according to a first embodiment.
Figure 2:
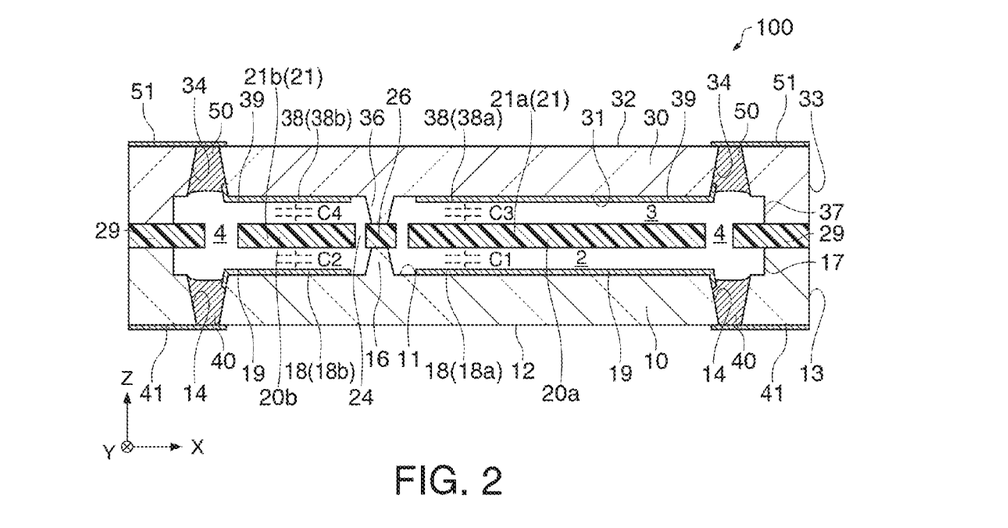
FIG. 2 is a cross-sectional view schematically showing the physical quantity sensor according to the embodiment.
Figure 3:
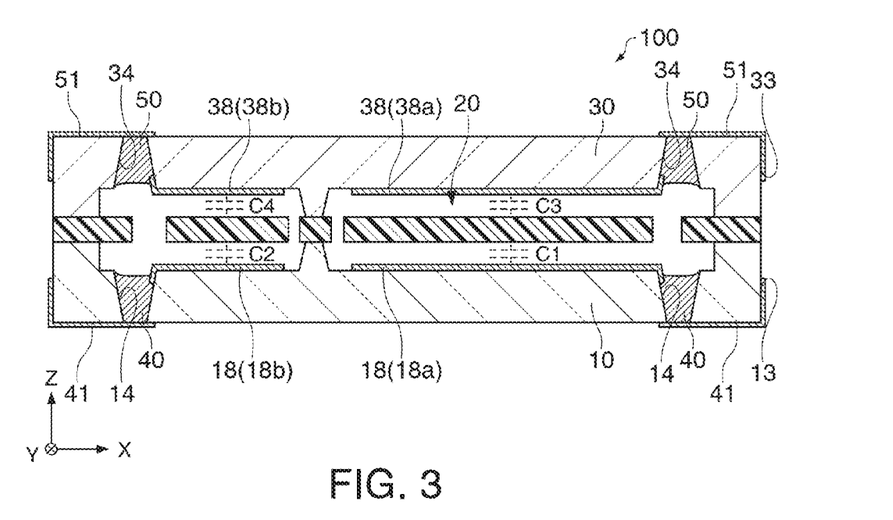
FIG. 3 is a cross-sectional view schematically showing the physical quantity sensor according to the embodiment.

FIG. 1 is a plan view schematically showing the physical quantity sensor 100 according to the embodiment. FIGS. 2 and 3 are cross-sectional views schematically showing the physical quantity sensor 100 according to the embodiment. FIGS. 2 and 3 correspond to cross-sectional views taken along the line II-II of FIG. 1. Moreover, for convenience sake, the illustration of a first substrate 10 and a second substrate 30 is omitted in FIG. 1. In FIGS. 1 to 3, the X-axis, the Y-axis, and the Z-axis are illustrated as three axes perpendicular to each other.

As shown in FIGS. 1 to 3, the physical quantity sensor 100 is configured to include the first substrate 10, the second substrate 30, and the movable body 20. The first substrate 10 includes a first fixed electrode portion 18 and first through-holes 14 respectively on and in a first base surface 11. The second substrate 30 includes a second fixed electrode portion 38 and second through-holes 34 respectively on and in a second base surface 31, the second base surface 31 being arranged to face the first base surface 11. The movable body 20 is arranged between the first substrate 10 and the second substrate 30 with gaps and includes a movable electrode portion 21 facing the first fixed electrode portion 18 and the second fixed electrode portion 38.

In the following, an example of a form of the movable body 20 will be first described.

As shown in FIG. 2, the movable body 20 is disposed above the first substrate 10. The movable body 20 includes the movable electrode portion 21 and an axial portion 22. The movable electrode portion 21 includes a first movable electrode 21a and a second movable electrode 21b whose mass is different from that of the first movable electrode 21a. The axial portion 22 is formed between the first movable electrode 21a and the second movable electrode 21b, and a portion serving as an axis of rotation of the movable body 20 is formed at the axial portion 22. In the illustrated example, the mass of the first movable electrode 21a is greater than the mass of the second movable electrode 21b. However, they may be opposite (not shown). The planar shape (shape as viewed from the Z-axis direction) of the movable body 20 is, for example, a rectangle.

The movable body 20 has a fixed portion 26 supporting the movable body 20 via the axial portion 22. As shown in FIG. 2, the fixed portion 26 is a portion bonded to a first protruding portion 16 and a second protruding portion 36, which will be described later, and held therebetween to be thereby fixed to the first substrate 10 and the second substrate 30. The fixed portion 26 is arranged in the interior of an opening 24 disposed in the axial portion 22 of the movable body 20. One fixed portion 26 is disposed on an imaginary line Q in plan view. Therefore, the movable body 20 is supported at one point. Specifically, in the interior of the opening 24, a beam portion 27 coupling the fixed portion 26 with the axial portion 22 is disposed. With this configuration, the fixed portion 26 can support the movable body 20 (the first movable electrode 21a and the second movable electrode 21b) via the axial portion 22.

For example, when acceleration in the vertical direction (Z-axis direction) occurs, the movable body 20 can rock in a seesaw manner (operate in a seesaw manner) about the imaginary line Q as the axis of rotation. In other words, the imaginary line Q can serve as the axis of rotation of the movable body 20. The imaginary line Q can be appropriately determined by the mechanical structure or design of the axial portion 22. Here, the imaginary line Q can be, for example, a straight line along a direction in which the beam portion 27 coupling the axial portion 22 with the fixed portion 26 extends.

The movable body 20 has a first seesaw piece 20a and a second seesaw piece 20b. The first seesaw piece 20a is one (portion located on the right of FIG. 1) of two portions of the movable body 20, where the two portions are defined by the imaginary line Q as the axis of rotation in plan view. The second seesaw piece 20b is the other (portion located on the left of FIG. 1) of the two portions of the movable body 20, where the two portions are defined by the imaginary line Q as the axis of rotation in plan view.

For example, when acceleration (for example, gravitational acceleration) in the vertical direction (Z-axis direction) is applied to the movable body 20, a rotation moment (moment of force) is generated in each of the first seesaw piece 20a and the second seesaw piece 20b. Here, when the rotation moment (for example, a clockwise rotation moment) of the first seesaw piece 20a and the rotation moment (for example, a counterclockwise rotation moment) of the second seesaw piece 20b are balanced, the inclination of the movable body 20 is not changed and thus a change in acceleration cannot be detected. Hence, the movable body 20 is designed such that when acceleration in the vertical direction (Z-axis direction) is applied, the rotation moment of the first seesaw piece 20a and the rotation moment of the second seesaw piece 20b are not balanced and thus a predetermined inclination is produced in the movable body 20.

In the physical quantity sensor 100, the imaginary line Q is arranged at a position shifted from the center (center of gravity) of the movable body 20 (distances from the imaginary line Q to tips of the respective seesaw pieces 20a and 20b are differentiated from each other), so that the seesaw pieces 20a and 20b have masses different from each other. That is, the mass of the movable body 20 is different between one region (the first seesaw piece 20a) and the other region (the second seesaw piece 20b) with the imaginary line Q as the boundary. In the illustrated example, a distance from the imaginary line Q to an edge surface 24 of the first seesaw piece 20a is greater than a distance from the imaginary line Q to an edge surface 25 of the second seesaw piece 20b. Moreover, the thickness of the first seesaw piece 20a is equal to the thickness of the second seesaw piece 20b. Hence, the mass of the first seesaw piece 20a is greater than the mass of the second seesaw piece 20b. Since the seesaw pieces 20a and 20b have masses different from each other as described above, when acceleration in the vertical direction (Z-axis direction) is applied, the rotation moment of the first seesaw piece 20a and the rotation moment of the second seesaw piece 20b can be prevented from being balanced. Hence, when acceleration in the vertical direction (Z-axis direction) is applied, a predetermined inclination can be produced in the movable body 20.

Although not illustrated, the seesaw pieces 20a and 20b may have masses different from each other by arranging the imaginary line Q at the center of the movable body 20 and differentiating the thicknesses of the seesaw pieces 20a and 20b from each other. Also in this case, when acceleration in the vertical direction (Z-axis direction) is applied, a predetermined inclination can be produced in the movable body 20.

The movable body 20 is disposed spaced apart from the first substrate 10. As shown in FIG. 2, a gap 2 is disposed between the movable body 20 and the first substrate 10. Moreover, as shown in FIG. 2, a gap 3 is disposed between the movable body 20 and the second substrate 30. Moreover, as shown in FIGS. 1 and 2, a gap 4 is disposed between the movable body 20 and a frame body 29 disposed around the movable body 20. Since the gaps 2, 3, and 4 are present around the movable body 20, the movable body 20 can rock in a seesaw manner.

The movable body 20 includes the movable electrode portion 21. The movable electrode portion 21 has the first and second movable electrodes 21a and 21b. The movable electrode portion 21 may be composed of any one of the first and second movable electrodes 21a and 21b. The movable body 20 may be composed of a conductive material to thereby form the movable electrodes. Moreover, a movable electrode formed of a conductor layer such as of a metal can be formed on a surface of the movable body 20. In the illustrated example, the movable body 20 is composed of a conductive material (silicon doped with an impurity) to thereby form the first and second movable electrodes 21a and 21b. That is, the first seesaw piece 20a functions as the first movable electrode 21a, and the second seesaw piece 20b functions as the second movable electrode 21b.

The movable body 20 including the fixed portion 26 and the beam portion 27 is integrally formed. The movable body 20 is integrally disposed by patterning one substrate (silicon substrate). Moreover, the frame body 29 is also formed integrally from the same substrate. For example, the first substrate 10 is formed of an insulating material such as glass and the movable body 20 is formed of a semiconductor material such as silicon, whereby the movable body 20 and the first substrate 10 can be easily insulated from each other by bonding them together, and thus the sensor structure can be simplified.

The first substrate 10 has the first base surface 11 above which the movable body 20 is arranged, a first rear surface 12 on the side opposed to the first base surface 11, and a side surface 13 (surface connecting the first base surface 11 with the first rear surface 12). As illustrated, a first recess 17 including the first base surface 11 is disposed in the first substrate 10. Here, the first base surface 11 defines a bottom surface of the first recess 17. With this configuration, the gap 2 for the movable body 20 to rock in a seesaw manner can be formed. The material of the first substrate 10 is not particularly limited, but is, for example, glass.

On the first substrate 10, the first fixed electrode portion 18 (18a and 18b) disposed to face the movable electrodes 21a and 21b of the movable body 20 is disposed. In the illustrated example, the first fixed electrode portion 18 has a first detection electrode 18a and a second detection electrode 18b. The planar shape of the first detection electrode 18a and the planar shape of the second detection electrode 18b are line symmetrical with respect to, for example, the imaginary line Q.

The first detection electrode 18a is disposed on the first substrate 10 at a position facing the movable electrode 21a.

The movable electrode 21a and the first detection electrode 18a form a variable capacitance C1. The second detection electrode 18b is disposed on the first substrate 10 at a position facing the movable electrode 21b. The movable electrode 21b and the second detection electrode 18b form a variable capacitance C2. The variable capacitance C1 and the variable capacitance C2 are configured such that, for example, in a state where the movable body 20 shown in FIG. 2 is horizontal, they have the same capacity. The positions of the movable electrode 21a and the movable electrode 21b change according to the movable body 20 rocking in a seesaw manner. With this configuration, the capacitance values of the variable capacitances C1 and C2 are changed. In the illustrated example, since the movable body 20 itself constitutes the movable electrodes 21a and 21b, the movable electrodes 21a and 21b are electrodes having the same potential. A predetermined potential is given to the movable body 20 via the first and second protruding portions 16 and 36.

The material of the first and second detection electrodes 18a and 18b is, for example, aluminum, gold, ITO (Indium Tin Oxide), or the like. The material of the first and second detection electrodes 18a and 18b is desirably a transparent electrode material such as ITO. This is because, with the use of a transparent electrode material as the first and second detection electrodes 18a and 18b, when the first substrate 10 is a transparent substrate (glass substrate), a foreign substance or the like existing on the first and second detection electrodes 18a and 18b can be visually recognized easily.

The first protruding portion 16 protruding from the first base surface 11 is disposed on the first substrate 10. The first protruding portion 16 is a protruding portion formed integrally when the first recess 17 is formed in a prepared substrate. Hence, a top surface of the first protruding portion 16 can be flush with a top surface around the first recess 17. A wiring (not shown) for supplying a predetermined potential to the fixed portion 26 of the movable body 20 may be disposed at the first protruding portion 16.

The first through-holes 14 are disposed in the first substrate 10. As illustrated, the first through-hole 14 may be formed spaced apart from the first fixed electrode portion 18. The first through-hole 14 is formed corresponding to each of the first detection electrode 18a and the second detection electrode 18b. Hence, the first through-hole 14 corresponding to the first detection electrode 18a and the first through-hole 14 corresponding to the second detection electrode 18b are formed. The shape of the first through-hole 14 is not particularly limited, but may have, for example, a tapered inner wall surface. As illustrated, the first through-hole 14 may have a shape in which an opening surface gradually increases toward the positive Z-axis direction. Moreover, although not illustrated, the first through-hole 14 may have a shape in which the opening surface gradually increases toward the negative Z-axis direction.

As shown in FIG. 2, a first through-electrode 40 electrically connected with the first fixed electrode portion 18 is disposed in the first through-hole 14. When the first through-hole 14 is disposed spaced apart from the first fixed electrode portion 18, a wiring 19 electrically connecting the first fixed electrode portion 18 with the first through-electrode 40 is formed on the first base surface 11. The wiring 19 may be formed integrally from the same material as that of the first and second detection electrodes 18a and 18b.

The first through-electrode 40 is formed so as to fill the first through-hole 14. With this configuration, an exposed portion of the first through-electrode 40 is formed in the first through-hole 14 on the first rear surface 12 side. Hence, the first through-electrode 40 can serve as an external terminal of the first substrate 10. For the material of the first through-electrode 40, a publicly known conductive material used generally in MEMS device manufacturing processes can be used, and for example, copper, aluminum, gold, titanium, tungsten, or the like can be used.

On the first rear surface 12, a first wiring 41 connected with the first through-electrode 40 may be disposed. Moreover, as shown in FIG. 3, the first wiring 41 may extend from over the first rear surface 12 of the first substrate 10 to over the side surface 13 of the first substrate 10. The first wiring 41 is a lead-out wiring from the first through-electrode 40 and has a predetermined patterning shape. For the material of the first wiring 41, a publicly known conductive material used generally in MEMS device manufacturing processes can be used, and for example, copper, aluminum, gold, titanium, tungsten, ITO (Indium Tin Oxide), or the like can be used.

The second substrate 30 has the second base surface 31 above which the movable body 20 is arranged, a second rear surface 32 on the side opposed to the second base surface 31, and a side surface 33 (surface connecting the second base surface 31 with the second rear surface 32). As illustrated, a second recess 37 including the second base surface 31 is disposed in the second substrate 30. Here, the second base surface 31 defines a bottom surface of the second recess 37. With this configuration, the gap 3 for the movable body 20 to rock in a seesaw manner can be formed. The material of the second substrate 30 is not particularly limited, but is, for example, glass. In the embodiment, a substrate having the same pattern shape as that of the first substrate 10 formed with the first through-hole 14, the first protruding portion 16, and the like can be used for the second substrate 30.

On the second substrate 30, the second fixed electrode portion 38 (38a and 38b) disposed to face the movable electrodes 21a and 21b of the movable body 20 is disposed. The second fixed electrode portion 38 has a third detection electrode 38a disposed at a position facing the movable electrode 21a and a fourth detection electrode 38b disposed at a position facing the movable electrode 21b. Here, the second fixed electrode portion 38 has the same pattern shape as that of the first fixed electrode portion 18. Specifically, the third detection electrode 38a has the same pattern shape as that of the first detection electrode 18a, while the fourth detection electrode 38b has the same pattern shape as that of the second detection electrode 18b.

The third detection electrode 38a is disposed on the second substrate 30 at the position facing the movable electrode 21a. The movable electrode 21a and the third detection electrode 38a form a variable capacitance C3. The fourth detection electrode 38b is disposed on the second substrate 30 at the position facing the movable electrode 21b. The movable electrode 21b and the fourth detection electrode 38b form a variable capacitance C4.

The variable capacitance C3 and the variable capacitance C4 are configured such that, for example, in the state where the movable body 20 shown in FIG. 2 is horizontal, they have the same capacity. The positions of the movable electrode 21a and the movable electrode 21b change according to the movable body 20 rocking in a seesaw manner. With this configuration, the capacitance values of the variable capacitances C3 and C4 are changed. For the material of the third and fourth detection electrodes 38a and 38b, the same material as that of the first and second detection electrodes 18a and 18b is selected.

The second protruding portion 36 protruding from the second base surface 31 is disposed on the second substrate 30. The second protruding portion 36 is a protruding portion formed integrally when the second recess 37 is formed in a prepared substrate. Hence, a top surface of the second protruding portion 36 can be flush with a top surface around the second recess 37. A wiring (not shown) for supplying a predetermined potential to the fixed portion 26 of the movable body 20 may be disposed at the second protruding portion 36.

According to the physical quantity sensor according to the embodiment, the movable body is supported by the fixed portion 26 interposed between the first protruding portion 16 and the second protruding portion 36. According to the physical quantity sensor, compared to a form in which the movable body 20 is bonded on one protruding portion, the bonding reliability of the movable body 20 can be improved.

Moreover, the physical quantity sensor includes a form in which a top surface and an undersurface of the fixed portion 26 are held, so that stress arising from a difference in the thermal expansion coefficient of the material between the first and second substrates 10 and 30 (glass) and the movable body 20 (silicon) can be offset. Hence, the bonding reliability of the movable body 20 can be improved.

The second through-holes 34 are disposed in the second substrate 30. As illustrated, the second through-hole 34 may be formed spaced apart from the second fixed electrode portion 38. The second through-hole 34 is formed corresponding to each of the third detection electrode 38a and the fourth detection electrode 38b. Hence, the second through-hole 34 corresponding to the third detection electrode 38a and the second through-hole 34 corresponding to the fourth detection electrode 38b are formed. The second through-hole 34 has the same shape as that of the first through-hole 14. Moreover, the second through-hole 34 is located at the same position as that of the first through-hole 14 in plan view.

As shown in FIG. 2, a second through-electrode 50 electrically connected with the second fixed electrode portion 38 is disposed in the second through-hole 34. When the second through-hole 34 is disposed spaced apart from the second fixed electrode portion 38, a wiring 39 electrically connecting the second fixed electrode portion 38 with the second through-electrode 50 is formed on the second base surface 31. The wiring 39 may be formed integrally from the same material as that of the third and fourth detection electrodes 38a and 38b.

Here, a conductive layer of the third and fourth detection electrodes 38a and 38b and the wiring 39 is disposed so as to have the same pattern shape and wiring path length as those of the conductive layer of the first and second detection electrodes 18a and 18b and the wiring 19 formed on the first substrate 10.

The second through-electrode 50 is formed so as to fill the second through-hole 34. With this configuration, an exposed portion of the second through-electrode 50 is formed in the second through-hole 34 on the second rear surface 32 side. Hence, the second through-electrode 50 can serve as an external terminal of the second substrate 30. For the material of the second through-electrode 50, the same material as that of the first through-electrode 40 is used.

A second wiring 51 connected with the second through-electrode 50 may be disposed on the second rear surface 32. Moreover, as shown in FIG. 3, the second wiring 51 may extend from over the second rear surface 32 of the second substrate 30 to over the side surface 33 of the second substrate 30. The second wiring 51 is a lead-out wiring from the second through-electrode 50 and has a patterning shape and a wiring length similar to those of the first wiring 41. Moreover, for the material of the second wiring 51, the same material as that of the first wiring 41 is used. With this configuration, the first wiring 41 can have the same electrical characteristic as that of the second wiring 51.

As shown in FIG. 2, the movable body 20 is arranged between the first substrate 10 and the second substrate 30 with gaps. As illustrated, the first substrate 10 may be bonded at the top surface of the first protruding portion 16 with the fixed portion 26 of the movable body 20, and the top surface around the first recess 17 may be bonded with the frame body 29. Moreover, the second substrate 30 may be bonded at the top surface of the second protruding portion 36 with the fixed portion 26 of the movable body 20, and the top surface around the second recess 37 may be bonded with the frame body 29. With the configuration described above, the movable body 20 may be accommodated in the physical quantity sensor 100 as shown in FIG. 2.

As described above, in the physical quantity sensor 100, when acceleration in the vertical direction (Z-axis direction) is generated upon application of acceleration for example, the movable body 20 can rock in a seesaw manner (operate in a seesaw manner) about the imaginary line Q as the axis of rotation. With this configuration, the electrostatic capacitance values in the capacities of the variable capacitances C1 to C4 can be changed. With the configuration described above, the physical quantity sensor 100 can be used as an inertial sensor such as an acceleration sensor or a gyro sensor. Specifically, the physical quantity sensor 100 can be used as, for example, an electrostatic capacitive acceleration sensor for measuring acceleration in the vertical direction (Z-axis direction).

The physical quantity sensor 100 according to the embodiment has, for example, the following features.

In the physical quantity sensor 100, the electrical characteristic of the wiring from the first fixed electrode portion to the first through-electrode is the same as the electrical characteristic of the wiring from the second fixed electrode portion to the second through-electrode. Specifically, the wiring pattern and the length of the wiring path from the first fixed electrode portion 18 to the first through-electrode 40 formed on the first substrate 10 are formed so as to be substantially equal to the wiring pattern and the length of the wiring path from the second fixed electrode portion 38 to the second through-electrode 50 formed on the second substrate 30. Hence, a difference in length between the wiring path of the lead-out wiring to the external terminal in each of the variable capacitance C1 and the variable capacitance C2 and the wiring path of the lead-out wiring to the external terminal in each of the variable capacitance C3 and the variable capacitance C4 can be made small. With the configuration described above, it is possible to provide the physical quantity sensor 100 in which a difference in length between the wiring paths from the fixed electrodes to the external terminals can be made small.

MODIFIED EXAMPLE

Figure 4:
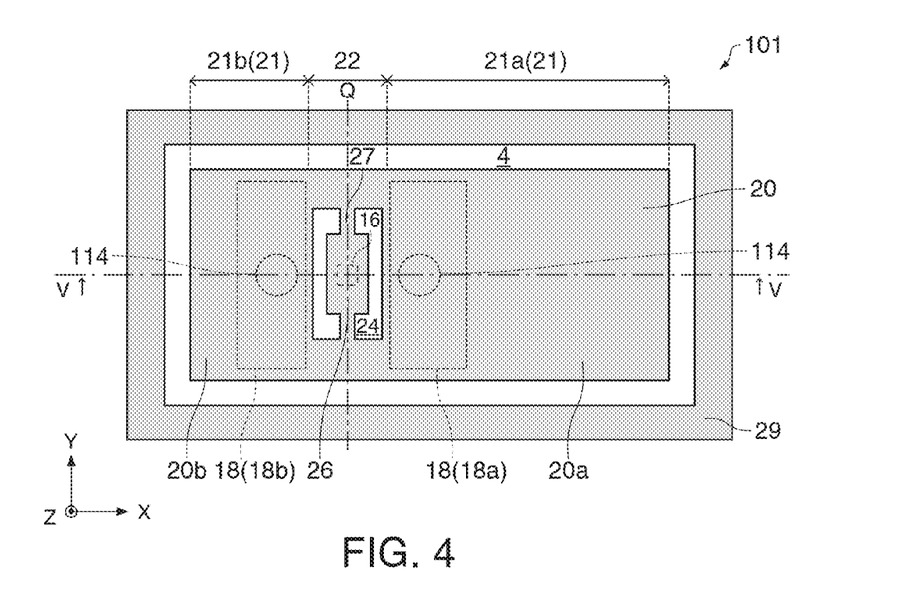
FIG. 4 is a plan view schematically showing a physical quantity sensor according to a modified example of the embodiment.
Figure 5:
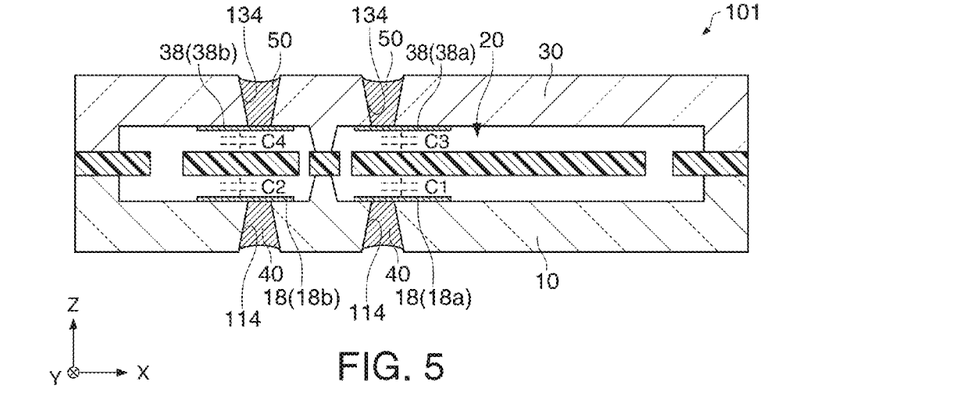
FIG. 5 is a cross-sectional view schematically showing the physical quantity sensor according to the modified example of the embodiment.

Next, a modified example of the physical quantity sensor 100 according to the embodiment will be described with reference to the drawings. FIG. 4 is a plan view schematically showing a physical quantity sensor 101 according to the modified example of the embodiment. FIG. 5 is a cross-sectional view schematically showing the physical quantity sensor 101 according to the modified example of the embodiment, corresponding to the line V-V of FIG. 4. The physical quantity sensor 101 according to the modified example is different from the physical quantity sensor 100 according to the embodiment only in the configurations of the first through-hole 14 and the second through-hole 34. In the following description, only the differences from the physical quantity sensor 100 according to the embodiment will be described. The configurations that have been already described are denoted by the same reference numerals and signs, and the detailed descriptions thereof are omitted.

As shown in FIGS. 4 and 5, in the physical quantity sensor 101 according to the modified example, a first through-hole 114 is arranged so as to overlap with at least a portion of the first fixed electrode portion 18 in plan view, the first through-electrode 40 is connected with the first fixed electrode portion 18, a second through-hole 134 is arranged so as to overlap with at least a portion of the second fixed electrode portion 38 in plan view, and the second through-electrode 50 is connected with the second fixed electrode portion 38.

Moreover, in the physical quantity sensor 101, the first through-hole 114 may have a tapered surface such that the opening area gradually increases in the negative Z-axis direction, while the second through-hole 134 may have a tapered surface such that the opening area gradually increases in the positive Z-axis direction. With this configuration, the physical quantity sensor 101 can be designed such that an exposed surface serving as an external terminal has a wider area. Moreover, since the opening area of the through-hole in each of the first and second base surfaces 11 and 31 can be made small when the through-hole is caused to overlap with the fixed electrode portion, limitations on dimensions in design can be reduced.

Moreover, although not illustrated, the first wiring 41 and the second wiring 51 may be formed in the physical quantity sensor 101 according to the modified example.

According to the physical quantity sensor 101 according to the modified example, there is no need to form a wiring between the first through-electrode 40 and the first fixed electrode portion 18 and between the second through-electrode 50 and the second fixed electrode portion 38. Hence, the wiring paths can be designed such that the lengths of the respective wiring paths from the fixed electrode portions 18 and 38 to the external terminals 40 and 50 are shorter. Hence, it is possible to provide the physical quantity sensor 101 in which the influence of a parasitic capacitance in the wiring from the fixed electrode to the external terminal is more reduced.

2. Method for Manufacturing Physical Quantity Sensor

Next, a method for manufacturing the physical quantity sensor according to the embodiment will be described with reference to the drawings. FIGS. 6 to 9 are cross-sectional views schematically showing manufacturing processes of the physical quantity sensor 100 according to the embodiment.

Figure 6:
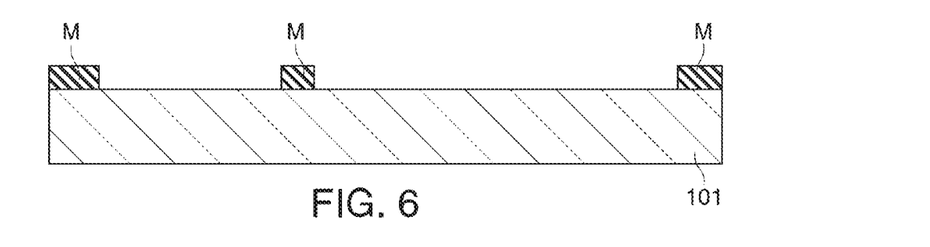
FIG. 6 is a cross-sectional view schematically showing a manufacturing process of the physical quantity sensor according to the embodiment.

As shown in FIG. 6, a mask M is formed on, for example, a glass substrate 101. The mask M is formed by, for example, depositing an insulating layer on the glass substrate 101 by a sputtering method, a coating method, or the like and then patterning the insulating layer into a predetermined shape.

Figure 7:
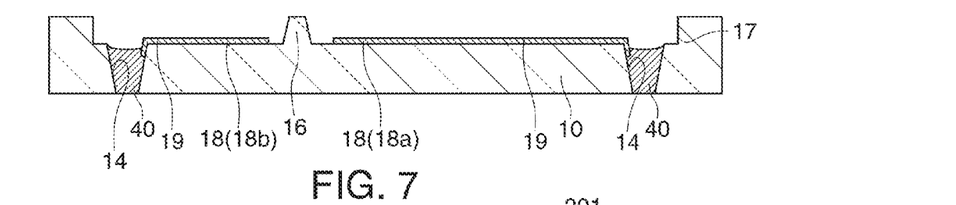
FIG. 7 is a cross-sectional view schematically showing a manufacturing process of the physical quantity sensor according to the embodiment.

As shown in FIG. 7, the glass substrate 101 is wet etched using the mask M as a mask to form the first recess 17. Moreover, in this process, the first through-holes 14 are formed at predetermined positions by forming a resist (not shown) or the like. With this configuration, the first substrate 10 can be formed. Next, the mask M is removed. Next, the first detection electrode 18a and the second detection electrode 18b are formed on the first base surface 11 defining the bottom portion of the first recess 17 (the second recess 37). The detection electrodes 18a and 18b are formed by depositing a conductive layer on the first base surface 11 of the first substrate 10 by a sputtering method or the like and then patterning the conductive layer using a photolithographic technique and an etching technique. Here, the wiring 19 can be integrally formed.

Moreover, the first through-electrode 40 is formed in the first through-hole 14 using a publicly known deposition technique such as electroless plating. Before the process of forming the detection electrodes 18a and 18b, the first through-electrode 40 may be formed.

Through the processes described above, the first substrate 10 formed with conductive members such as the first fixed electrode portion 18 can be formed. By forming a plurality of first substrates 10, the second substrate 30 formed with conductive members having substantially the same electrical characteristic can also be prepared.

Figure 8:
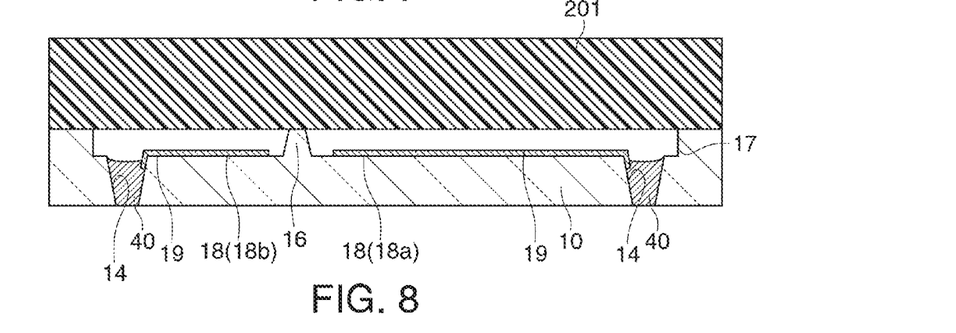
FIG. 8 is a cross-sectional view schematically showing a manufacturing process of the physical quantity sensor according to the embodiment.

As shown in FIG. 8, a silicon substrate 201 (sensor substrate) is bonded to the first substrate 10. The bonding of the first substrate 10 with the silicon substrate 201 is performed by, for example, anodic bonding or direct bonding, or using adhesive.

Figure 9:
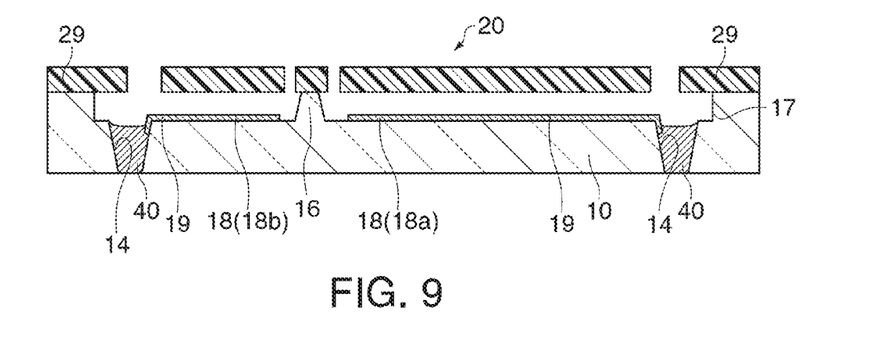
FIG. 9 is a cross-sectional view schematically showing a manufacturing process of the physical quantity sensor according to the embodiment.

As shown in FIG. 9, after thinning the silicon substrate 201 by, for example, grinding using a grinding machine, the silicon substrate 201 is patterned into a desired shape to thereby form the movable body 20 including the fixed portion 26 or the like and the frame body 29. The patterning is performed by a photolithographic technique and an etching technique (dry etching), and as a more specific etching technique, the Bosch process can be used. In this process, the movable body 20 and the frame body 29 are integrally formed by patterning (etching) the silicon substrate 201.

As shown in FIGS. 1 to 3, the second substrate 30 prepared in processes similar to the manufacturing processes of the first substrate 10 is placed above the movable body 20 and bonded thereto, whereby the physical quantity sensor 100 in which the movable body 20 is accommodated is manufactured. The bonding of the second substrate 30 with the movable body 20 or the frame body 29 is performed by, for example, anodic bonding, or using adhesive or the like.

Through the processes described above, the physical quantity sensor 100 can be manufactured.

3. Physical Quantity Sensor According to Second Embodiment

Figure 10:
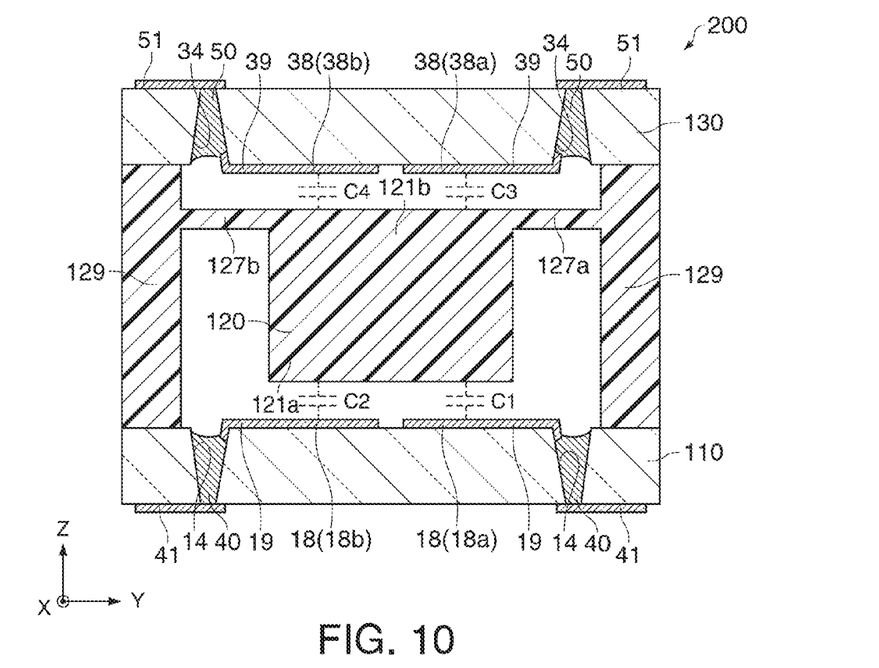
FIG. 10 is a cross-sectional view schematically showing a physical quantity sensor according to a second embodiment.

Next, a physical quantity sensor 200 according to a second embodiment will be described with reference to the drawing. FIG. 10 is a cross-sectional view schematically showing the physical quantity sensor 200 according to the embodiment. As described in the first embodiment, the structure of the movable body 20 applied to the physical quantity sensor is not limited to the structure described above. Hence, the physical quantity sensor 200 according to the embodiment is different from the physical quantity sensor 100 according to the first embodiment mainly in the configuration of the movable body. In the following description, only the differences from the physical quantity sensor 100 according to the embodiment will be described. The configurations that have been already described are denoted by the same reference numerals and signs, and the detailed descriptions thereof are omitted. The physical quantity sensor 200 can be used as, for example, an electrostatic capacitive acceleration sensor for measuring acceleration in the vertical direction (Z-direction) similarly to the physical quantity sensor 100 described above.

As shown in FIG. 10, in the physical quantity sensor 200 according to the second embodiment, a first substrate 110 and a second substrate 130 are plate-like substrates in which the first recess 17 and the second recess 37 are not formed. Hence, a first base surface 111 is a surface defining a surface of the first substrate 110, and a second base surface 131 is a surface defining a surface of the second substrate 130.

A movable body 120 is disposed between the first substrate 110 and the second substrate 130 with gaps. The movable body 120 is supported by a first beam portion 127a and a second beam portion 127b. The movable body 120 has a mass required for detecting acceleration. For example, when acceleration in the vertical direction (Z-direction) is applied, force according to the exerted acceleration is applied to the movable body 120 and thus the movable body 120 is displaced in the Z-direction. This displacement is detected by the fixed electrode portions 18 and 38, whereby the exerted acceleration can be obtained. The movable body 120 includes a movable electrode portion including movable electrodes 121a and 121b.

The first beam portion 127a and the second beam portion 127b are disposed between the first substrate 110 and the second substrate 130 with gaps. The first beam portion 127a and the second beam portion 127b extend from a frame body 129 to the movable body 120. The first beam portion 127a and the second beam portion 127b support the movable body 120. The first beam portion 127a and the second beam portion 127b can flex when acceleration is applied to the movable body 120.

The frame body 129 is disposed around the movable body 120. The frame body 129 is fixed to the first substrate 110 and the second substrate 130. The frame body 129 and the movable body 120 are connected via the first beam portion 127a and the second beam portion 127b. The movable body 120, the first beam portion 127a and the second beam portion 127b, and the frame body 129 are integrally disposed.

Next, operations of the movable body 120 and changes with the operations in the capacitance values of the variable capacitances C1, C2, C3, and C4 will be described.

For example, when vertically downward (negative Z-direction) acceleration is applied to the movable body 120, the movable body 120 is displaced in the negative Z-direction. With the displacement of the movable body 120, the capacitance values of the variable capacitances C1 and C2 are increased, while the capacitance values of the variable capacitances C3 and C4 are reduced. Moreover, when, for example, vertically upward (positive Z-direction) acceleration is applied to the movable body 120, the movable body 120 is displaced in the positive Z-direction. With the displacement of the movable body 120, the capacitance values of the variable capacitances C1 and C2 are reduced, while the capacitance values of the variable capacitances C3 and C4 are increased. In the physical quantity sensor 200, based on four detection signals (differential signals) indicating the changes in the capacitance values of the variable capacitances C1 to C4, the magnitude and direction of acceleration can be detected.

Also in the physical quantity sensor 200, an electrical characteristic of a wiring from the first fixed electrode portion 18 to the first through-electrode 40 can be made the same as an electrical characteristic of a wiring from the second fixed electrode portion 38 to the second through-electrode 50 similarly to the physical quantity sensor 100. The physical quantity sensor 200 according to the second embodiment can also have features similar to those of the physical quantity sensor 100 according to the first embodiment.

4. Electronic Apparatuses

Next, electronic apparatuses according to the embodiment will be described with reference to the drawings. The electronic apparatuses according to the embodiment include any of the physical quantity sensors according to the embodiment of the invention. In the following, electronic apparatuses including the physical quantity sensor 100 as the physical quantity sensor according to the embodiment of the invention will be described.

Figure 11:
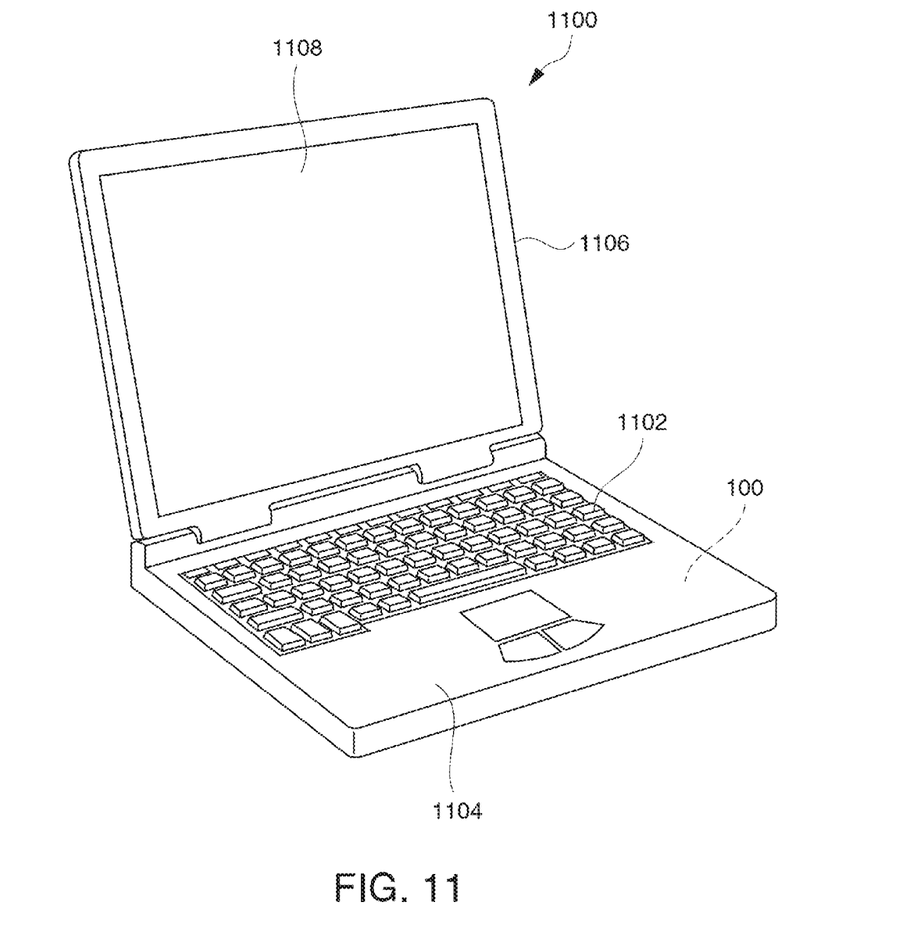
FIG. 11 is a perspective view schematically showing an electronic apparatus according to the embodiment.

FIG. 11 is a perspective view schematically showing a mobile (or notebook) personal computer 1100 as an electronic apparatus according to the embodiment.

As shown in FIG. 11, the personal computer 1100 includes a main body portion 1104 including a keyboard 1102 and a display unit 1106 having a display portion 1108. The display unit 1106 is rotationally movably supported relative to the main body portion 1104 via a hinge structure portion.

In the personal computer 1100, the physical quantity sensor 100 is incorporated.

Figure 12:
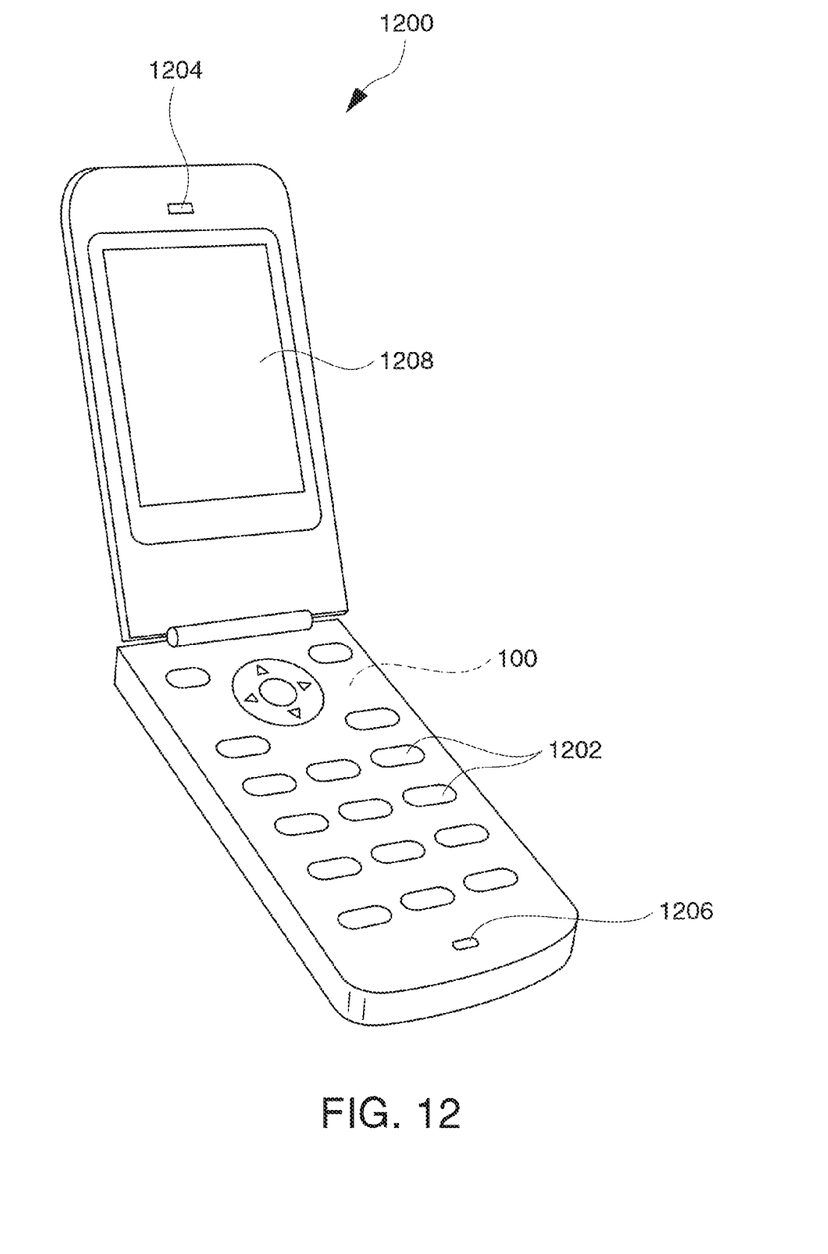
FIG. 12 is a perspective view schematically showing an electronic apparatus according to the embodiment.

FIG. 12 is a perspective view schematically showing a mobile phone (including a PHS) 1200 as an electronic apparatus according to the embodiment.

As shown in FIG. 12, the mobile phone 1200 includes a plurality of operation buttons 1202, an earpiece 1204, and a mouthpiece 1206. A display portion 1208 is arranged between the operation buttons 1202 and the earpiece 1204.

In the mobile phone 1200, the physical quantity sensor 100 is incorporated.

Figure 13:
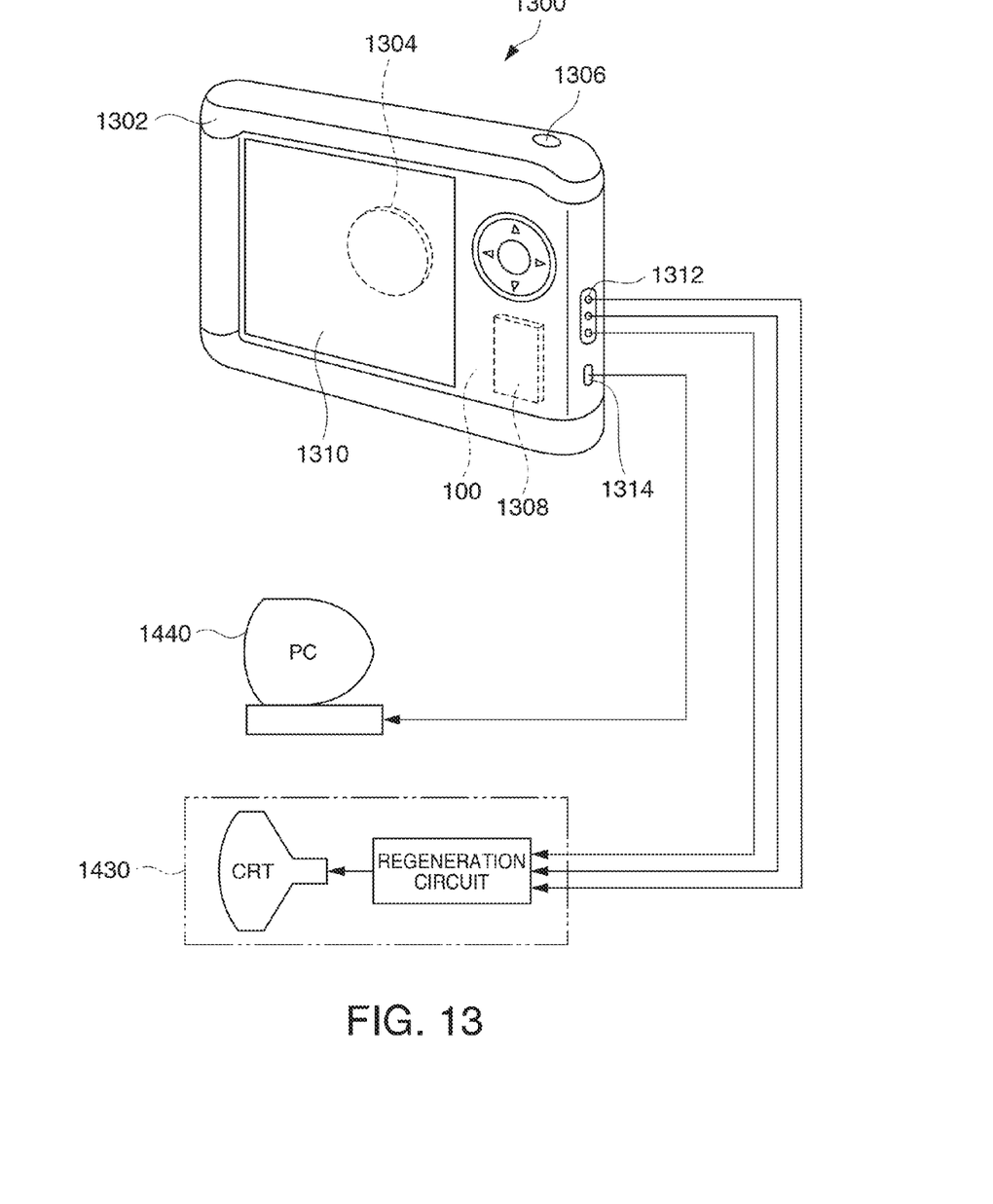
FIG. 13 is a perspective view schematically showing an electronic apparatus according to the embodiment.

FIG. 13 is a perspective view schematically showing a digital still camera 1300 as an electronic apparatus according to the embodiment. In FIG. 13, connections with external apparatuses are also shown in a simplified manner.

Here, usual cameras expose a silver halide photographic film with an optical image of a subject, whereas the digital still camera 1300 photoelectrically converts an optical image of a subject with an imaging element such as a CCD (Charge Coupled Device) to generate imaging signals (image signals).

A display portion 1310 is disposed on the back surface of a case (body) 1302 in the digital still camera 1300 and configured to perform display based on imaging signals generated by a CCD. The display portion 1310 functions as a finder that displays a subject as an electronic image.

Moreover, on the front side (the rear side in the drawing) of the case 1302, a light receiving unit 1304 including an optical lens (imaging optical system) and a CCD is disposed.

When a photographer confirms a subject image displayed on the display portion 1310 and presses down a shutter button 1306, imaging signals of a CCD at the time are transferred to and stored in a memory 1308.

Moreover, in the digital still camera 1300, a video signal output terminal 1312 and a data communication input/output terminal 1314 are disposed on the side surface of the case 1302. Then, a television monitor 1430 and a personal computer 1440 are connected as necessary to the video signal output terminal 1312 and the data communication input/output terminal 1314, respectively. Further, the imaging signals stored in the memory 1308 are output to the television monitor 1430 or the personal computer 1440 by a predetermined operation.

In the digital still camera 1300, the physical quantity sensor 100 is incorporated.

The electronic apparatuses 1100, 1200, and 1300 described above include the physical quantity sensor 100.

An electronic apparatus including the physical quantity sensor 100 can be applied to for example, in addition to the personal computer (mobile personal computer) shown in FIG. 11, the mobile phone shown in FIG. 12, and the digital still camera shown in FIG. 13, inkjet ejection apparatuses (for example, inkjet printers), laptop personal computers, television sets, video camcorders, video tape recorders, various kinds of navigation systems, pagers, electronic notebooks (including those with communication function), electronic dictionaries, calculators, electronic gaming machines, word processors, workstations, videophones, surveillance television monitors, electronic binoculars, POS terminals, medical equipment (for example, electronic thermometers, sphygmomanometers, blood glucose meters, electrocardiogram measuring systems, ultrasonic diagnosis apparatuses, and electronic endoscopes), fishfinders, various kinds of measuring instrument, indicators (for example, indicators used in vehicles, aircraft, and ships), flight simulators, and the like.

The invention includes a configuration (for example, a configuration having the same function, method, and result, or a configuration having the same advantage and effect) that is substantially the same as those described in the embodiments. Moreover, the invention includes a configuration in which a non-essential portion of the configurations described in the embodiments is replaced. Moreover, the invention includes a configuration that provides the same operational effects as those described in the embodiments, or a configuration that can achieve the same advantages. Moreover, the invention includes a configuration in which a publicly known technique is added to the configurations described in the embodiments.

The entire disclosure of Japanese Patent Application No. 2012-089968, filed Apr. 11, 2012 is expressly incorporated by reference herein.

What is claimed is:

1. A physical quantity sensor comprising:
    a first substrate including first and second fixed electrodes disposed on a first base surface of the first substrate, and first and second through-holes provided in the first substrate;
    a second substrate including third and fourth fixed electrodes disposed on a second base surface of the second substrate, and third and fourth through-holes provided in the second substrate, the second base surface being arranged to face the first base surface;
    a movable body arranged between the first substrate and the second substrate, the movable body being configured with first and second movable pieces, the first and second movable pieces respectively being provided with first and second movable electrodes, a first mass of the first movable piece being larger than a second mass of the second movable piece; and
    first through fourth through-electrodes being respectively provided in the first through fourth through-holes, the first through fourth through-electrodes being respectively electrically connected to the first through fourth fixed electrodes, wherein
    the first and third through-holes overlap with each other in a plan view, and the second and fourth through-holes overlap with each other in the plan view.

2. The physical quantity sensor according to claim 1, wherein
    an electrical characteristic of a wiring from the first fixed electrode to the first through-electrode is the same as an electrical characteristic of a wiring from the third fixed electrode to the third through-electrode.

3. The physical quantity sensor according to claim 1, wherein
    the first through-hole is arranged so as to overlap with at least a portion of the first fixed electrode in the plan view, and
    the second through-hole is arranged so as to overlap with at least a portion of the second fixed electrode in the plan view.

4. The physical quantity sensor according to claim 1, wherein
    the first substrate has a first outer surface opposite to the first base surface,
    the second substrate has a second outer surface opposite to the second base surface,
    a first wiring connected to the first through-electrode is disposed on the first outer surface,
    a second wiring connected to the third through-electrode is disposed on the second outer surface, and
    the first wiring has the same electrical characteristic as that of the second wiring.

5. The physical quantity sensor according to claim 4, wherein
    the first wiring extends from over the first outer surface of the first substrate to over a side surface of the first substrate, and
    the second wiring extends from over the second outer surface of the second substrate to over a side surface of the second substrate.

6. The physical quantity sensor according to claim 1, wherein
    a first protruding portion is disposed on the first base surface of the first substrate,
    a second protruding portion is disposed on the second base surface of the second substrate, and
    the movable body is held between the first protruding portion and the second protruding portion.

7. An electronic apparatus comprising:
    the physical quantity sensor according to claim 1; and
    a display that displays an image.

8. The physical quantity sensor according to claim 1, wherein
    a first gap between the first fixed electrode and the first movable piece corresponds to a first variable capacitance value that changes by changing the first gap,
    a second gap between the second fixed electrode and the second movable piece corresponds to a second variable capacitance value that changes by changing the second gap,
    a third gap between the third fixed electrode and the first movable piece corresponds to a third variable capacitance value that changes by changing the third gap,
    a fourth gap between the fourth fixed electrode and the second movable piece corresponds to a fourth variable capacitance value that changes by changing the fourth gap, and
    the physical quantity sensor detects magnitude and a direction of acceleration based on the first through fourth variable capacitance values.

* * * * *